United States Patent
Bancalari

(10) Patent No.: US 6,295,803 B1
(45) Date of Patent: Oct. 2, 2001

(54) GAS TURBINE COOLING SYSTEM

(75) Inventor: Eduardo E. Bancalari, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/429,101

(22) Filed: Oct. 28, 1999

(51) Int. Cl.$^7$ .................... F02C 7/08; F02C 7/141
(52) U.S. Cl. .............. 60/39.511; 60/39.75; 415/114
(58) Field of Search ............... 60/39.02, 39.511, 60/39.75, 39.083; 415/114

(56) References Cited

U.S. PATENT DOCUMENTS

| | | | |
|---|---|---|---|
| 2,883,152 | * | 4/1959 | Turunen et al. ............... 415/114 |
| 3,355,883 | * | 12/1967 | Beam ............... 60/39.511 |
| 3,730,644 | | 5/1973 | Jubb . |
| 3,756,020 | | 9/1973 | Moskowitz et al. . |
| 4,271,664 | | 6/1981 | Earnest . |
| 4,438,625 | | 3/1984 | Rice . |
| 4,825,643 | | 5/1989 | Hennecke et al. . |
| 4,894,984 | | 1/1990 | Papastavros . |
| 4,991,391 | | 2/1991 | Kosinski . |
| 5,255,505 | | 10/1993 | Cloyd et al. . |
| 5,297,386 | | 3/1994 | Kervistin . |
| 5,317,877 | | 6/1994 | Stuart . |
| 5,357,742 | | 10/1994 | Miller . |
| 5,365,730 | | 11/1994 | Bruckner et al. . |
| 5,490,377 | | 2/1996 | Janes . |
| 5,579,631 | | 12/1996 | Chen et al. . |
| 5,581,996 | | 12/1996 | Koch et al. . |
| 5,697,208 | | 12/1997 | Glezer et al. . |
| 5,722,241 | | 3/1998 | Huber . |
| 5,755,556 | | 5/1998 | Hultgren et al. . |
| 5,782,076 | | 7/1998 | Huber et al. . |
| 5,802,841 | | 9/1998 | Maeda . |
| 5,819,525 | | 10/1998 | Gaul et al. . |

FOREIGN PATENT DOCUMENTS

| | | | |
|---|---|---|---|
| 0138677 | | 4/1985 | (EP) . |
| 1467142 | | 4/1967 | (FR) . |
| 2185204 | | 12/1973 | (FR) . |
| 2552163 | * | 3/1985 | (FR) ............... 60/39.511 |
| 578686 | * | 7/1946 | (GB) ............... 60/39.511 |
| 2131095 | | 6/1984 | (GB) . |

* cited by examiner

Primary Examiner—Louis J. Casaregola

(57) ABSTRACT

A gas turbine engine (10) having a closed-loop cooling circuit (39) for transferring heat from the hot turbine section (16) to the compressed air (24) produced by the compressor section (12). The closed-loop cooling system (39) includes a heat exchanger (40) disposed in the flow path of the compressed air (24) between the outlet of the compressor section (12) and the inlet of the combustor (14). A cooling fluid (50) may be driven by a pump (52) located outside of the engine casing (53) or a pump (54) mounted on the rotor shaft (17). The cooling circuit (39) may include an orifice (60) for causing the cooling fluid (50) to change from a liquid state to a gaseous state, thereby increasing the heat transfer capacity of the cooling circuit (39).

14 Claims, 2 Drawing Sheets

GAS TURBINE COOLING SYSTEM

REFERENCE TO GOVERNMENT CONTRACTS

Development for this invention was supported in part by U.S. Department of Energy Contract No. DE-FC21-95MC32267. Accordingly, the United States Government may have certain rights in is invention.

FIELD OF THE INVENTION

The present invention relates generally to turbomachinery, and more specifically, to a cooling system for a combustion turbine engine, and particularly to a cooling system for hot turbine parts that returns the waste heat to the pre-combustion gas flow.

BACKGROUND OF THE INVENTION

The performance of a gas/combustion turbine may be improved by increasing the temperature of the combustion process. As the firing temperature increases, the requirement for cooling of the turbine parts exposed to the combustion gases increases.

It is known to bleed a portion of the compressed air produced in the compressor section of a gas turbine for use as a cooling medium in the turbine portion of the engine. The compressed air may be injected into the flow of combustion gas to provide an insulating film along the turbine surfaces, or it may be passed through internal cooling passages formed in the hot turbine parts in a closed cooling system. After being heated in the internal cooling passages of a closed system, the heated compressed air may be returned to a lower pressure portion of the compressor, or alternatively, to the inlet of the combustor. By providing heated air to the combustor the overall efficiency of the gas turbine engine system may be improved. One example of such a prior art device is illustrated in U.S. Pat. No. 5,782,076 issued to Huber et al. on Jul. 21, 1998, incorporated by reference herein.

One drawback of the prior art device of Huber is that the return of the hot compressed air to the combustor may cause fluid flow disturbances that complicate the design of the combustor system. Another drawback of the aforementioned configuration is that it is limited to compressed air as the cooling medium. What is needed is an apparatus and method for cooling a combustion turbine wherein the waste heat from the turbine portion is returned to the combustion air without generating a flow disturbance. It is also desired to provide a method and apparatus for cooling hot turbine parts in a manner that provides an efficient transfer of heat away from the turbine parts while returning the waste heat to the combustion process.

SUMMARY OF THE INVENTION

These and other objects of the invention are satisfied by a gas turbine engine comprising a compressor having an outlet for discharging compressed air; a combustor having an inlet for receiving compressed air from the compressor outlet and an outlet for discharging combustion gas; a turbine having an inlet for receiving combustion gas from the combustor outlet and having a hot portion heated by the combustion gas; a cooling circuit for transferring heat from the hot portion to the compressed air, the cooling circuit further comprising: a heat exchanger disposed in a flow path of the compressed air between the compressor outlet and the combustor inlet; a cooling passage formed proximate the hot portion; a first connection between the outlet of the cooling passage and the inlet of the heat exchanger; and a second connection between the inlet of the cooling passage and the outlet of the heat exchanger.

In a combustion turbine system having a compressor for producing compressed air, a combustor for burning a fuel in the compressed air to produce combustion gas, a diffuser for directing the compressed air to the combustor, a turbine for extracting energy from the combustion gas, the turbine having a cooling passage formed therein, a method of cooling the turbine is disclosed herein comprising the steps of: providing a heat exchanger in the flow path of the compressed air between the compressor and the combustor; connecting the heat exchanger to the cooling passage to form a closed-loop cooling path; pumping a cooling fluid through the closed-loop cooling path to transfer heat energy from the turbine to the compressed air.

DETAILED DESCRIPTION OF THE INVENTION

Figure 1:
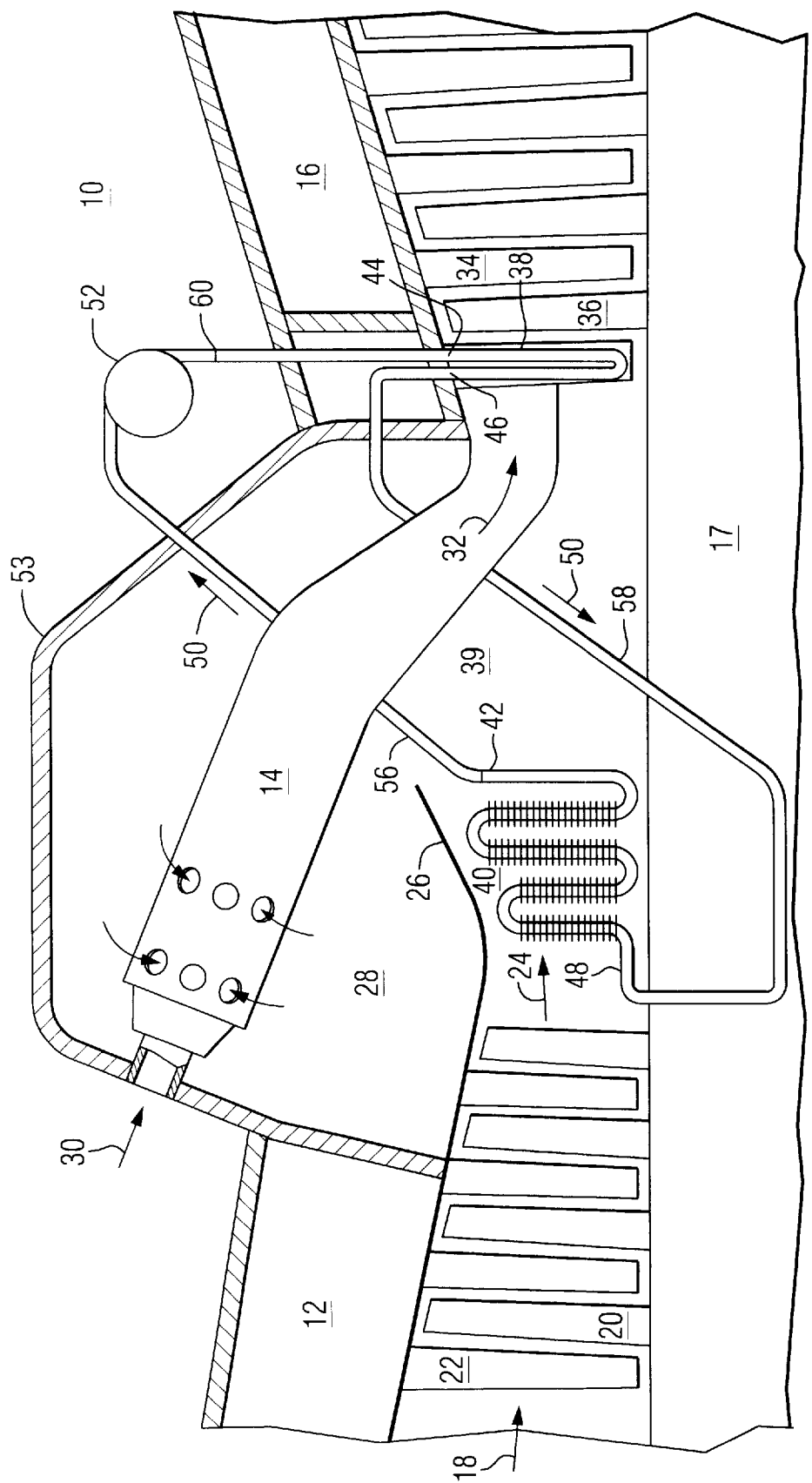
FIG. 1 is a partially schematic, partially diagrammatic view of a portion of a gas turbine engine incorporating a closed loop cooling circuit for removing heat from the hot turbine parts and returning that heat to the combustion gas, including a pump arrangement.
Figure 2:
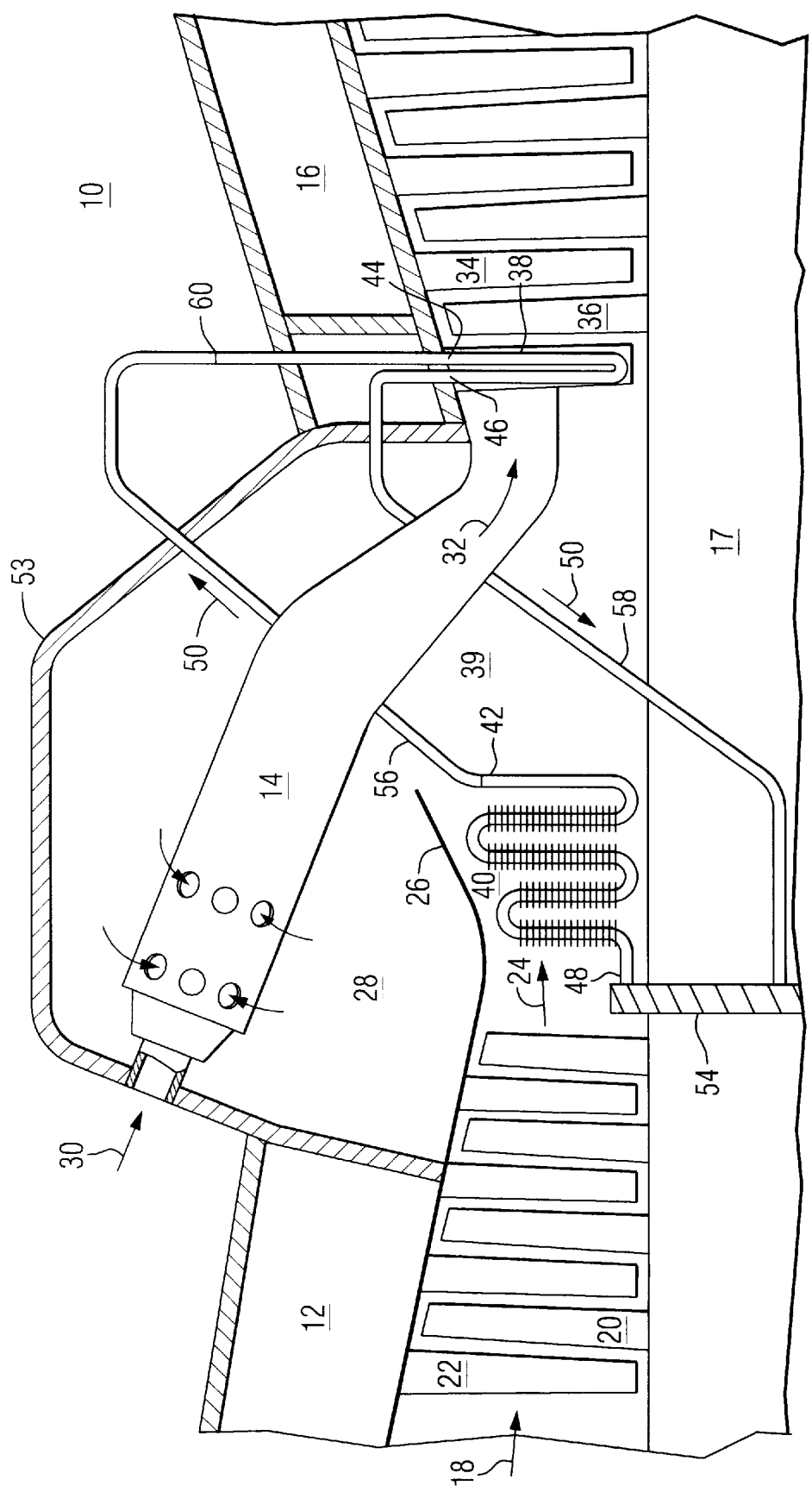
FIG. 2 is a partially schematic, partially diagrammatic view of a portion of a gas turbine engine incorporating a closed loop cooling circuit for removing heat from the hot turbine parts and returning that heat to the combustion gas, including an impeller arrangement.

As illustrated in the Figure, a gas turbine engine 10 (also known in the industry as a combustion turbine engine) includes a compressor section 12, a combustor 14, and a turbine section 16. A rotor 17 passes through and between the compressor section 12 and the turbine section 16. Inlet air 18 is drawn into the engine 10 and passes through a plurality of rotating blades 20 and stationary vanes 22. Blades 20 are rotated by the turning of the rotor 17, thereby compressing the inlet air 18 to produce compressed air 24 at an outlet of the compressor section 12. Compressed air 24 traverses a flow path passing through a diffuser 26 to an annulus area 28 prior to entering combustor 14 where it is combined with a fuel 30 to produce a hot combustion gas 32. Combustion gas 32 is expanded in turbine portion 16 as it passes through a plurality of rows of stationary vanes 34 and rotating blades 36. The expansion of the combustion gas 32 in the turbine section 16 imparts energy to the rotating blades 36 which, in turn, drive the rotation of rotor 17 and an electrical generator (not shown). It is known in other embodiments of gas turbines that the energy imparted to the rotor may be used for purposes other than driving an electrical generator. For example, gas turbine engines are known to be used as aircraft engines, tank engines, and as power plants for ships. The apparatus and method of the present invention is useful for all such applications.

It is known in the art to provide a hot portion of the turbine section 16, such as for example the row 1 stationary vanes 34 or other portion of the turbine exposed to the combustion gas 32, with cooling passages for the introduction of a cooling fluid. The applicant's invention utilizes these hot portion cooling passages 38 as part of a closed-loop cooling system 39 for the gas turbine engine 10.

As illustrated in the Figure, a heat exchanger 40 is disposed in the flow path of the compressed air 24 between the outlet of the compressor section 12 and the inlet of the combustor 14. The shell side of heat exchanger 40 is exposed to the compressed air 24. The outlet 42 of the tube side of heat exchanger 40 is connected to the inlet 44 of cooling passage 38. The outlet 46 of cooling passage 38 is connected to the inlet 48 of the tube side of heat exchanger 40, thereby forming a closed-loop cooling path or circuit 39. A cooling fluid 50, such as steam, air, glycol, liquid metals or other cooling medium is circulated within the cooling circuit 39. The cooling fluid 50 is heated as it passes through cooling passage 38, thereby cooling a hot portion of the turbine section 16. The heated cooling fluid 50 is cooled as it passes through heat exchanger 40, thereby imparting heat energy to compressed air 24. In this manner heat energy is moved from the hot portion of the turbine section 16 to the compressed air 24 prior to the introduction of the compressed air 24 into combustor 14. The heat energy provided to the compressed air 24 by heat exchanger 40 reduces the amount of fuel 30 that is necessary in order to achieve the desired firing temperature of the combustion gas 32, thereby improving the overall efficiency of the gas turbine engine 10.

A pump, fan, or other means for circulating the cooling fluid 50 is provided within the cooling circuit. Preferably, the means for circulating is provided in one of the connections between the heat exchanger 40 and the cooling circuit 38. In the embodiment illustrated in the Figure, a pump 52 is disposed in the connection between the outlet 42 of the heat exchanger 40 and the inlet 44 of cooling circuit 38. Pump 52 is illustrated as being external to the compressor section 12, combustor 14, and turbine section 16 and located outside of the engine casing 53. Alternatively, a means for circulating may be disposed internal to the compressor section 12 or turbine section 16, as illustrated by the impeller 54 disposed about the rotor shaft 17 within the compressor section 12. It is expected that only one means for circulating the cooling fluid is necessary to provide the necessary motive force, however two alternative pump arrangements 52, 54 are shown in the Figure for purposes of illustration.

Heat exchanger 40 is illustrated as a fined pipe disposed within diffuser 26. Alternatively, the heat exchanger may be located anywhere within or proximate to the flow path of the compressed air 24 between the outlet of the compressor section 12 and the inlet of the combustor 14. The heat exchanger can also be located within the confines of the compressor section. Heat exchanger 40 is illustrated as having the cooling fluid 50 on a tube side of the heat exchanger 40, although alternative embodiments may include the cooling fluid on a shell side of the heat exchanger with the compressed air 24 passing through the tube side of the heat exchanger. Alternatively, the heat exchanger 40 may not be a tube design but rather may pass the cooling fluid 50 through the walls of the diffuser 26 or through other structures in the vicinity of the flow path of the compressed air 24.

The present invention includes a method for cooling the combustion turbine system 10 by providing a heat exchanger 40 in the flow path of the compressed air 24 between the compressor section 12 and the combustor 14. The method further includes the step of connecting the heat exchanger 40 to cooling passage 38 formed in a hot portion of the turbine section 16. A cooling fluid 50 is pumped through the closed-loop cooling path 39 defined by the heat exchanger 40, the cooling passage 38, and their interconnecting piping 56, 58. As the cooling fluid 50 passes through the cooling passage 38 it removes heat energy from a hot portion of the turbine section 16, such as stationary blade 34. As the cooling fluid 50 passes through heat exchanger 40 it releases heat energy to the compressed air 24. The step of providing a heat exchanger 40 may include providing heat exchanger 40 within diffuser 26 or at any other location in the flow path of compressed air 24, so that the heat energy derived from the heat exchanger 40 serves to augment the heat produced by the burning of fuel 30 in combustor 14.

Cooling fluid 50 and the operating parameters of the closed loop cooling circuit 39 may be selected so that cooling fluid 50 is changed from a liquid to a gaseous state for absorbing heat from the hot turbine section parts and then changes back to a liquid for releasing heat to the compressed air 24. By utilizing the heat of evaporation of cooling fluid 50, the heat transfer capacity of cooling circuit 39 may be increased. For such an application, an orifice 60 may be provided in the cooling circuit 39 to provide a pressure drop, thereby causing boiling of the cooling fluid 50. Pump 54 may act as a compressor to return cooling fluid 50 to the liquid state. Fluids known in the art of heat transfer and compatible with the materials of the gas turbine engine may be used as the cooling fluid 50 in such applications.

In a typical combustion turbine engine 10 having a power output in the range of 230 megawatts, a closed-loop cooling path 39 as described above may have the capability to transfer $12.0 \times 10^7$ Btu/Hr of heat energy from the turbine section 16 to the compressed air 24. The heat transferred by such a system would increase the simple cycle efficiency of the engine by over 10 percent.

The embodiments described above are provided for the purpose of illustration, not limitation. Accordingly, the full scope of the applicant's invention is as described in the following claims.

I claim as my invention:

1. A gas turbine comprising:

a compressor having an outlet for discharging compressed air;

a combustor having an inlet for receiving compressed air from the compressor outlet and an outlet for discharging combustion gas;

a turbine having an inlet for receiving combustion gas from the combustor outlet and having a hot portion heated by the combustion gas;

a cooling circuit adapted to transfer heat from the hot portion to the compressed air with a non-electrically-conductive cooling fluid, the cooling circuit comprising:

a heat exchanger disposed in a flow path of the compressed air between the compressor outlet and the combustor inlet;

a cooling passage formed proximate the hot portion;

a first connection between an outlet of the cooling passage and an inlet of the heat exchanger; and a second connection between an inlet of the cooling passage and an outlet of the heat exchanger.

2. The gas turbine of claim 1, further comprising a pump disposed in the cooling circuit and operable to move a cooling fluid through the cooling circuit.

3. The gas turbine of claim 2, wherein the pump comprises an impeller disposed about a rotor of the compressor.

4. The gas turbine of claim 2, wherein the pump is disposed in one of the first and the second connections.

5. The gas turbine of claim 1, further comprising a diffuser disposed in a flow path of the compressed air between the compressor and the combustor, and wherein the heat exchanger comprises tubing disposed within the diffuser.

6. The gas turbine of claim 1, further comprising an orifice disposed in the cooling circuit, said orifice being adapted to provide a pressure drop sufficient to cause the cooling fluid to boil, whereby heat transfer capacity of the heat transfer circuit is enhanced.

7. The gas turbine of claim 1, further comprising a cooling medium contained within the cooling circuit.

8. A cooling apparatus for cooling a hot portion of a gas turbine with a non-electrically-conductive fluid, the cooling apparatus comprising:

a heat exchanger operable to be disposed proximate a flow path of compressed air between a compressor and a combustor of a gas turbine;

a cooling passage formed proximate a hot portion of the turbine section of the gas turbine;

connections between the heat exchanger and the cooling passage forming a closed-loop circuit for a non-electrically-conductive cooling fluid.

9. The cooling apparatus of claim 8, further comprising a pump disposed within the closed-loop circuit and operable to move a cooling fluid about the closed-loop circuit.

10. The cooling system of claim 9, wherein the pump is disposed external to the compressor, combustor and turbine section.

11. The cooling system of claim 9, wherein the pump comprises an impeller attached to a rotor of the gas turbine.

12. The cooling system of claim 8, wherein the heat exchanger comprises a pipe disposed in a flow path of compressed air between the compressor and the combustor.

13. The cooling system of claim 8, further comprising one of the group of steam and air.

14. The cooling system of claim 8, further comprising an orifice disposed in one of the connections, said orifice being adapted to provide a pressure drop sufficient to cause the cooling fluid to boil, whereby heat transfer capacity of the heat transfer circuit is enhanced.

\* \* \* \* \*